United States Patent
Ai et al.

(10) Patent No.: US 11,801,609 B2
(45) Date of Patent: Oct. 31, 2023

(54) SHAFTING STRUCTURE OF AN INTEGRATED JOINT FOR A COLLABORATIVE ROBOT

(71) Applicant: GUANGZHOU ACCUGLEN INTELLIGENT TECH CO., LTD., Guangdong (CN)

(72) Inventors: Ying Ai, Guangdong (CN); Weihong Pan, Guangdong (CN); Suzhen Yan, Guangdong (CN); Jun Dong, Guangdong (CN)

(73) Assignee: GUANGZHOU ACCUGLEN INTELLIGENT TECH CO., LTD., Guangdong (CN)

( * ) Notice: Subject to any disclaimer, the term of this patent is extended or adjusted under 35 U.S.C. 154(b) by 302 days.

(21) Appl. No.: 17/419,853

(22) PCT Filed: Jun. 23, 2020

(86) PCT No.: PCT/CN2020/097654
§ 371 (c)(1),
(2) Date: Jun. 30, 2021

(87) PCT Pub. No.: WO2021/212648
PCT Pub. Date: Oct. 28, 2021

(65) Prior Publication Data
US 2022/0314466 A1   Oct. 6, 2022

(30) Foreign Application Priority Data

Apr. 23, 2020   (CN) .......................... 202010326552.7

(51) Int. Cl.
| B25J 17/02 | (2006.01) |
| B25J 9/10 | (2006.01) |
| F16H 49/00 | (2006.01) |

(52) U.S. Cl.
CPC .......... *B25J 17/0241* (2013.01); *B25J 9/108* (2013.01); *B25J 9/1025* (2013.01); *F16H 49/001* (2013.01); *F16H 2049/003* (2013.01)

(58) Field of Classification Search
CPC ...... B25J 17/0241; B25J 9/1025; B25J 9/108; F16H 49/001; F16H 2049/003
See application file for complete search history.

(56) References Cited

U.S. PATENT DOCUMENTS

| 11,378,169 | B2 * | 7/2022 | Rizk ...................... F16H 49/001 |
| 2007/0039414 | A1 * | 2/2007 | Takemura ............. F16H 49/001 |
| | | | 74/640 |
| 2022/0186787 | A1 * | 6/2022 | Thompson ............ F16H 49/001 |

FOREIGN PATENT DOCUMENTS

| CN | 108422442 A | * | 8/2018 | .......... B25J 17/0258 |
| CN | 208557581 U | * | 3/2019 | .......... B25J 17/0258 |

(Continued)

*Primary Examiner* — Zakaria Elahmadi
(74) *Attorney, Agent, or Firm* — McClure, Qualey & Rodack, LLP

(57) ABSTRACT

The present invention discloses a shafting structure of an integrated joint for a collaborative robot, wherein two ends of a long input shaft are respectively a motor rear end and a flexspline end, and a harmonic gear drive is installed on the flexspline end; the motor rear end is coaxially provided with a motor rear end bearing set, a motor rear end inner race pressing ring, a motor rear end outer race pressing ring, a motor rear end outer race seat and a motor rear end angle encoder mounting seat; and the flexspline end is provided coaxially with a flexspline end bearing set, a flexspline end inner race pressing ring and the harmonic gear drive. In the present invention high-precision position feedback and control can be realized.

9 Claims, 6 Drawing Sheets

(56) References Cited

FOREIGN PATENT DOCUMENTS

| | | | | |
|---|---|---|---|---|
| CN | 114263721 A | * | 4/2022 | ................ F16C 3/18 |
| WO | WO-2021024825 A1 | * | 2/2021 | ........... F16H 49/001 |

* cited by examiner

SHAFTING STRUCTURE OF AN INTEGRATED JOINT FOR A COLLABORATIVE ROBOT

TECHNICAL FIELD

The present invention relates to the technical field of cooperative robots, in particular to a shafting structure of an integrated joint of a cooperative robot that can assist in achieving high precision position feedback.

BACKGROUND TECHNOLOGY

At present, industrial robots have already replaced humans to a great extent in doing repetitive, heavy-load jobs. However, robots have to be isolated during work to prevent personnel from being injured due to lack of safety measures for collaboration with people. In recent years, a collaborative robot that can safely collaborate with people to complete specific tasks has gradually emerged. And the collaborative robot has a broad application prospect, especially in precision assembly, mold and product inspection, medical surgery and other fields demanding a high precision control. However, instead of repeated point-to-point positioning accuracy required for industrial robots in the past, conducting a human-robot collaboration needs full-range high precision control in the workspace, which requires that only when each joint of the cooperative robot is capable of providing high-precision position feedback and in control, can the cooperative robot meet the goal of Omni beating high-precision control in the workspace after calibration.

Joint structures of currently popular high-precision collaborative robots are mainly formed by connecting sequentially a controller, a driver, a direct-drive motor, a brake and a harmonic gear drive in series, and installing an angle encoder at a rear end of the direct-drive motor and an output end of the harmonic gear drive for position feedback and control. When measuring rotation degree and position, a rotating part of the angle encoder rotates coaxially along with the measured axis, and determines the rotation angle and position relative to a fixed part of the angle encoder. Nevertheless, in the integrated joint of cooperative robot, due to angle measurement principles, limitation of installation space, as well as consideration of cost, the angle encoder usually measures the angle with the shafting structure in the joint, as a result, the angular encoder is very sensitive to the radial error of the joint shafting structure. Only when the rotating part of the angle encoder is mounted on a joint shafting structure with high radial accuracy, can the high precision position feedback of the angle encoder be realized, and it is critical to ensure a high axial accuracy between especially an output end and an input end of the harmonic gear drive. The rotating parts of the angle encoders on the rear end of the direct-drive motor and the output end of the harmonic gear drive respectively rotate coaxially along with the input end and the output end of the harmonic gear drive, and the fixed parts of the two angle encoders are fixed on static parts of the integrated joint, therefore, high coaxial accuracy between the output end and the input end of the harmonic gear drive after installation is the key prerequisite for high-precision position feedback and control of the integrated joint of the cooperative robot.

However, in the mainstream collaborative robot integrated joint structure, the harmonic gear drive input shaft, the direct drive motor and the brake are merely connected in sequence, there is no corresponding mechanism between the input end of the harmonic gear drive and the output end of a circular spline to promise the coaxial accuracy between them, and connection by only an internal flex-spline is not rigid enough, which leads to insufficient overall rigidity of the joint shafting structure. When subject to dead weight and some loads, the output end of the circular spline may displace toward perpendicular to the axis of the shaft system, so it is difficult to ensure the coaxial accuracy between the output end and the input end of the harmonic gear drive. In addition, when the direct-drive motor starts and runs for a period of time, the direct-drive motor may heat up, and will consequently result in elongation of the series structure in the joint and lead to greater deformation perpendicular to the axis of the shaft system, which is not contributive for obtaining high-precision position signal feedback. At the same time, the extension of the joint components after the temperature rises may lead to the relative position movement of the rotating part and the fixed part of the angle encoder, which may lead to the change of the signal obtained by the angle encoder and affect the measurement result. All these will make it difficult to achieve the goal of high precision control of the collaborative robot integrated joint.

Now there is a need for a shafting structure applying to an integrated joint of a collaborative robot, assisting in realizing high-precision position feedback so that both the input shaft and the output end of the circular spline of the harmonic gear drive can retain high coaxial accuracy under the condition of high load, long-term operation and heat generation by virtue of this shafting structure.

SUMMARY OF INVENTION

The present invention aims to overcome the deficiencies in the prior art and provide a shafting structure of an integrated joint for a collaborative robot. The present shafting structure can not only assist to provide position feedback and control of high accuracy, but also can accommodate to different temperature conditions of the working environment, so that even in case of motor heating, and the input shaft becomes longer, the input shaft and the output end of the circular spline of the harmonic gear drive can work stably and remain in a high coaxial accuracy.

The present invention offers following technical schemes: a shafting structure of an integrated joint for a collaborative robot, comprises a long input shaft, a harmonic gear drive, a motor rear end bearing set, a flexspline end bearing set, a motor rear end bearing inner race pressing ring, a motor rear end bearing outer race pressing ring, a flexspline end bearing inner race pressing ring, a motor rear end bearing outer race seat and a motor rear end angle encoder mounting seat;

Two ends of the long input shaft are respectively a motor rear end and a flexspline end, and the harmonic gear drive is installed on the flexspline end;

The motor rear end bearing set, the motor rear end bearing inner race pressing ring, the motor rear end bearing outer race pressing ring, the motor rear end bearing outer race seat and the motor rear end angle encoder mounting seat are coaxially provided on the motor rear end, wherein the motor rear end bearing inner race pressing ring is provided outside an end face of the motor rear end bearing set, the motor rear end bearing outer race pressing ring is provided surrounding the motor rear end bearing inner race pressing ring and compacting a periphery of the motor rear end bearing set, the motor rear end bearing outer race seat is pressed against the periphery of the motor rear end bearing set, and the motor rear end angle encoder mounting seat is provided on an outer end of the motor rear outer race pressing ring;

And on the flexspline end are coaxially provided a flexspline end bearing set, a flexspline end bearing inner race pressing ring and the harmonic gear drive, the flexspline end bearing inner race pressing ring is provided on one side of an end face of the flexspline end bearing set, and the harmonic gear drive is provided on a periphery of flexspline end bearing set and another side of the end face thereof.

Further, on one side of the harmonic gear drive is also provided a harmonic gear drive fixing seat, one end of the harmonic gear drive fixing seat extends into an inner cavity of the flexspline of the harmonic gear drive and is held tight by the flexspline end bearing set and the harmonic gear drive, and another end of the harmonic gear drive fixing seat is fixedly connected to the motor rear end bearing outer race seat.

Further, the long input shaft is a hollow shaft and an outer wall of the long input shaft is a cylindrical structure with several different diameters; the outer wall of the long input shaft where the harmonic gear drive is connected is a two-stage cylindrical structure, the outer wall of the long input shaft connected with the flexspline end bearing inner race pressing ring and the flexspline end bearing set is a three-stage cylindrical structure, and the outer wall of the long input shaft connected with the motor rear end bearing inner race pressing ring and the motor rear end bearing set is also a three-stage cylindrical structure.

The above-mentioned long input shaft is installed specifically in a following manner: one end of the long input shaft passes the wave generator and the flexspline of the harmonic gear drive through precision shaft holes with high coaxial accuracy and forms an input end of the harmonic gear drive.

One end of the long input shaft close to the input end of the harmonic gear drive is provided with a two-stage cylindrical structure (corresponding to foregoing description, "an outer wall of the long input shaft where the harmonic gear drive is connected is a two-stage cylindrical structure"). An input shaft flexspline mounting shoulder formed by the two-stage cylindrical structure is used to install an assembly unit of the wave generator and the flexspline of the harmonic gear drive. Two three-stage cylindrical structures, namely a three-stage cylindrical structure of the motor rear end, and a three-stage cylindrical structure of the flexspline end, which are respectively used to install corresponding bearing sets are provided in another end of the long input shaft near the motor rear end and a central part of the long input shaft near the wave generator of the harmonic gear drive (corresponding to foregoing description, "the outer wall of the long input shaft connected with the flexspline end bearing inner race pressing ring and the flexspline end bearing set is a three-stage cylindrical structure" and "the outer wall of the long input shaft connected with the motor rear end bearing inner race pressing ring and the motor rear end bearing set is also a three-stage cylindrical structure.") The three-stage cylindrical structure of the motor rear end, the motor rear end bearing set, the motor rear end bearing inner race pressing ring, the motor rear end bearing outer race pressing ring and the motor rear end bearing outer race seat constitute a motor rear end bearing structure with high coaxial accuracy, and the motor rear end bearing inner race pressing ring is connected to the three-stage cylindrical structure of the motor rear end via threads or fasteners so that the motor rear end bearing inner race pressing ring firstly presses against and fixes an inner race of an outside bearing in the motor rear end bearing set and an inner race of an inside bearing in the motor rear end bearing set, then connects to the motor rear end bearing outer race pressing ring and the motor rear end bearing outer race seat by threads or fasteners, and therefore the motor rear end bearing outer race pressing ring compacts an outer race of the outside bearing in the motor rear end bearing set and an outer race of the inside bearing in the motor rear end bearing set; or the motor rear end bearing outer race pressing ring is connected to the motor rear end bearing outer race seat via threads or fasteners so that the motor rear end bearing outer race pressing ring firstly presses against and fixes the outer race of the outside bearing in the motor rear end bearing set and the outer race of the inside bearing in the motor rear end bearing set, and then connects to the motor rear end bearing inner race pressing ring and the three-stage cylindrical structure of the motor rear end, and therefore the motor rear end bearing inner race pressing ring squeezes the inner race of the outside bearing in the motor rear end bearing set and the inner race of the inside bearing in the motor rear end bearing set, thereby eliminating bearing clearances, at the same time, by eliminating the bearing clearances in this way, a dead center is formed in the long input shaft when temperature changes in various working conditions (especially when a length of the long input shaft changes as temperature rises after the motor heats after being started and running for some time), so that when the rotating part of the angle encoder at the motor rear end is connected to the long input shaft, overall stability of the angle encoder will not be subject to change due to a length change of the long input shaft and consequently degradation of angle measurement accuracy will not occur. The three-stage cylindrical structure of the flexspline, the flexspline end bearing set, the harmonic gear drive fixing base and the flexspline end inner ring pressing ring compose an input shaft flexspline end bearing structure with high coaxial accuracy, and the flexspline end bearing inner race pressing ring and the three-stage cylindrical structure at the flexspline end are connected by threads or fasteners so that the flexspline end bearing inner race pressing ring compacts an inner race of an outside bearing in the flexspline end bearing set and an inner race of an inside bearing in the flexspline end bearing set, thereby eliminating bearing clearances. At the same time, by eliminating the bearing clearances in this way, gaps are reserved in between both sides of outer races of the flexspline end bearing set and the harmonic gear drive fixing seat, so that a live center is formed in the long input shaft, when temperature changes in different working conditions (especially when the motor is started and runs for some time and heats, the temperature rises), a length of the long input shaft can change freely along the shaft direction according to temperature changes without generating any axial deformation. And by adopting this structure, it can be promised that, in different working conditions and temperatures, especially when the motor heats after being started and running for some time, a change of length of the long input shaft won't affect overall structural stability of the angle encoder provided on a circular spline output end of the harmonic gear drive, and degradation of angle measurement accuracy can be avoided.

The harmonic gear drive fixing seat and the motor rear end bearing outer race seat are connected by fasteners with high coaxial precision, the harmonic gear drive fixing seat and a shell of the harmonic gear drive are connected by fasteners, aligning until an output end of the circular spline of the harmonic gear drive and the harmonic gear drive fixing seat share the same axis with high precision, so that when installing, in case of no load, the harmonic gear drive will not produce deformation perpendicular to the axis of the shaft system, and the output end of the circular spline of the harmonic gear drive is located in a position sharing a common axis with the joint shaft system. In the meanwhile, such a double shaft bearing set structure, can not only increase overall rigidity of the integrated joint, ensure structural stability of the harmonic gear drive input end and the circular spline output end under various working conditions and temperatures, and achieve high precision coaxiality between the harmonic gear drive input end and the circular spline output end, but also can evenly distribute influence of structural weight and load weight to the joint shafting structure, thereby avoiding influence of local deformation caused by dead weight and load on accuracy of joint position feedback and control.

The long input shaft is a hollow shaft, and a central hole thereof is used to pass trachea, oil pipes, cables and optical fibers, etc. required by the cooperative robot; one end of the long input shaft near the input end of the harmonic gear drive is provided with a shoulder formed by a two-stage cylindrical structure. A diameter of an outer first stage cylindrical structure is smaller, slightly smaller than a diameter of an inner hole of the wave generator of the harmonic gear drive, so as to form a precise shaft-hole engagement; another end of the long input shaft near the motor rear end and the central part near the wave generator of the harmonic gear drive are respectively provided with a three-stage cylinder structure with different diameters, diameters of all the cylindrical structures in the two three-stage cylindrical structures gradually become smaller towards an outside direction of the motor rear end so that after the long input shaft is installed in the wave generator of the harmonic gear drive to form the input end of the harmonic gear drive, the flexspline end bearing set of the input shaft, the direct drive motor, the brake and the motor rear end bearing set can be installed stage by stage. A groove for installing the direct drive motor and the brake is arranged between the flexspline end and the three-stage cylindrical structure at the motor rear end, so that the direct drive motor and brake can be installed through keys or splines and a shape of the groove is determined according to an installation mode of the direct drive motor and the brake. Between the direct drive motor and the flexspline end bearing set is provided a sealing ring, which can prevent dust generated during operation of the direct drive motor and the brake from entering the flexspline end bearing set and the harmonic gear drive of the input shaft, so as not to affect normal operation and coaxial accuracy of the flexspline end bearing set and the harmonic gear drive. The three-stage cylindrical structure at the motor rear end of the long input shaft, the motor rear end bearing set, the motor rear end bearing inner race pressing ring, the motor rear end bearing outer race pressing ring and the motor rear end bearing outer race seat constitute a structure at the motor rear end to eliminate bearing clearances, and by eliminating the bearing clearances in this way, a dead point of length change of the long input shaft is formed, so that when the temperature rises after the motor is started and runs for a period of time, a change of the long input shaft length will not affect a position of the rotating part of the angle encoder of the motor rear end connected to the long input shaft. In addition, between the motor rear end bearing outer race seat and the three-stage cylindrical structure at the motor rear end of the long input shaft is provided a sealing ring, which can prevent the dust generated during operation of the direct drive motor and the brake from entering the bearing set structure at the motor rear end, so as not to affect normal operation and coaxial accuracy of the motor rear end bearing set.

A first stage cylinder structure at an outer side of the three-stage cylinder structure at the motor rear end is connected with the motor rear end bearing inner race pressing ring through threads or fasteners during installation, so that the motor rear end bearing inner race pressing ring is pressed against an inner race of an outer bearing in the motor rear end bearing set. A threaded hole is provided in an end face of the first stage cylinder structure at an outer side of the three-stage cylinder structure at the motor rear end, so that the motor rear end angle encoder mounting seat can be connected with the first stage cylinder structure at an outer side of the three-stage cylinder structure with high coaxial precision through fasteners, so as to provide a prerequisite for high precision feedback of motor position signals and control of motor rotation angles; a diameter of the second stage cylindrical structure of the three-stage cylindrical structure at the motor rear end is slightly smaller than a diameter of inner rings of bearing inner races of the motor rear end bearing set to achieve precise hole-shaft engagement. A diameter of the third stage cylindrical structure of the three-stage cylindrical structure at the motor rear end is less than an inner ring diameter of outer races of the motor rear end bearing set, and greater than an outer ring diameter of inner races of the motor rear end bearing set, so that during installation, a side of the third stage cylinder structure of the three-stage cylindrical structure compacts the inner races of the motor rear end bearing set.

The three-stage cylindrical structure of the flexspline end, the input shaft flexspline end bearing set, the harmonic gear drive fixing seat and the input shaft flexspline end bearing inner race pressing ring constitute a structure at the input shaft flexspline end to eliminate bearing clearances with high coaxial accuracy. At the same time, by eliminating clearances in this way, more gaps are left between both sides of the outer races of the flexspline end bearing set and the harmonic gear drive fixing seat, so as to form a live center for the long input shaft to become longer under various working environment temperature conditions, especially when the temperature rises after the motor is started and runs for a period of time, the input long shaft at this end can change freely along the axial direction as the temperature changes without any change in the radial direction. This structure can ensure that under various working environment temperature conditions, especially when the motor is started and runs for a period of time and becomes heated, a change of a length of the long input shaft will not affect stability of the overall structure of the angle encoder connected to the output end of the harmonic gear drive, to prevent reduction of angle measurement accuracy.

The first stage cylindrical structure inside the three-stage cylindrical structure of the shaft flexspline end is connected with the flexspline end bearing inner race pressing ring by threads or fasteners during installation, so that the flexspline end bearing inner race pressing ring can be pressed against an inner race of an inner bearing in the input shaft flexspline end bearing set; a diameter of the second stage cylinder structure in the three-stage cylindrical structure of the flexspline end is slightly smaller than a diameter of inner rings of bearing inner races of the flexspline end bearing set to achieve precise hole-shaft engagement; a diameter of the third stage cylindrical structure of the three-stage cylindrical structure at the flexspline end is less than a diameter of inner rings of outer races of the flexspline end bearing set and greater than an outer ring diameter of inner races of the flexspline end bearing set, so that a side of the third stage cylindrical structure of the three-stage cylindrical structure at the flexspline end supports an inner race of an inner bearing in the flexspline end bearing set during installation.

Further, both the motor rear end bearing inner race pressing ring and flexspline end bearing inner race pressing ring are annular cylindrical structures. The motor rear end bearing inner race pressure ring is an annular cylindrical structure, and connected with the three-stage cylindrical structure at the motor rear end by countersunk holes provided on an end surface thereof with inner threads or fasteners, so that the motor rear end bearing inner race pressure ring supports the inner race of an outer bearing in the motor rear end bearing set. The shaft flexspline end bearing inner race pressing ring is also an annular cylindrical structure, and connected with the three-stage cylindrical structure of the flexspline end through the countersunk holes on an end face thereof through inner threads or fasteners during installation, so that the flexspline end bearing inner race pressing ring supports the inner ring of the inner bearing of the flexspline end bearing set.

Further, the motor rear end bearing outer race pressing ring is a three-stage ring structure; along a direction from a middle part of the long input shaft to the motor rear end, the three-stage ring structure successively comprises a first-stage ring structure of the outer race pressing ring, a second-stage ring structure of the outer race pressing ring and a third-stage ring structure of the outer race pressing ring with diameter decreasing stage by stage; the first-stage ring structure of the outer race pressing ring is connected with the motor rear end bearing outer race seat through threads or fasteners; a diameter of an inner cavity of the second-stage ring structure of the outer race pressing ring is larger than an outer ring diameter of outer races of the motor rear end bearing set; a diameter of an inner cavity of the third-stage ring structure of the outer race pressing ring is smaller than an outer ring diameter of outer races of the motor rear end bearing set, and larger than an outer ring diameter of the bearing inner races of the motor rear end bearing set; and a place where the third-stage structure of the outer race pressing ring is connected to the motor rear end bearing inner race pressing ring is provided with a sealing ring. In the three-stage ring structure, inner threads of the first stage ring structure with the largest diameter can be connected with the motor rear end bearing outer race seat through countersunk holes provided on an end face of the first-stage ring structure of the outer race pressing ring by fasteners; the diameter of the inner cavity of the second-stage ring structure is larger than the outer ring diameter of the outer races of the motor rear end bearing set. The inner diameter of the third-stage ring structure is smaller than the inner ring diameter of the outer races of the motor rear end bearing set, and larger than the outer ring diameter of the inner races of the motor rear end bearing set. When installing, a side of the third-stage ring structure supports the outer bearing race of an outer bearing in the motor rear end bearing set. There is an annular groove or no annular groove on one side of an inner circular surface of the third-stage ring structure close to the motor rear end bearing inner race pressure ring. A sealing ring can be installed in the annular groove during installation to prevent external pollutants from entering the motor rear end bearing structure and affecting operation stability and coaxial accuracy of the bearing structure.

Further, the motor rear end bearing outer race seat is a two-stage ring structure, and along a direction from a center of the long input shaft to a circumference thereof, the two-stage ring structure comprises a first-stage ring structure of the motor rear end bearing outer race seat and a second-stage ring structure of the motor rear end bearing outer race seat; a periphery of the first-stage ring structure of the motor rear end bearing outer race seat is connected to the motor rear end bearing outer race pressing ring through threads or fasteners; an annular shoulder is arranged in an inner cavity of the first-stage ring structure of the outer ring seat at the motor rear end and a diameter of an inner edge of the annular shoulder is larger than a diameter of an outer edge of an inner race of the motor rear end bearing set but less than a diameter of an outer edge of an outer race of the motor rear end bearing set. The second-stage ring structure of the motor rear end bearing outer race seat is connected with the harmonic gear drive fixing seat. In the two-stage ring structure, the first-stage ring structure with a smaller diameter can be connected to the motor rear end bearing outer race pressing ring by threads or fasteners provided on an outer side of the first-stage ring structure; a diameter of an inner hole of the first-stage annular structure is slightly larger than the diameter of the outer edge of the outer race of the motor rear end bearing set to achieve precise hole-shaft engagement; the diameter of the inner edge of the annular shoulder provided in the inner cavity of the first-stage ring structure of the motor rear end bearing outer race seat is larger than the diameter of the outer edge of the inner race of the motor rear end bearing set but less than the diameter of the outer edge of the outer race of the motor rear end bearing set, so when installing, the annular shoulder of the motor rear end bearing outer race seat supports an outer race of an inner bearing in the motor rear end bearing set. There is an annular groove or no annular groove in the annular shoulder of the motor rear end bearing outer race seat orienting towards the inner surface of the three-stage cylindrical structure at the motor rear end of the input shaft. A sealing ring can be installed in the annular groove to form a seal between the third stage cylindrical structure of the three-stage cylindrical structure at the motor rear end of the input shaft and the motor rear end bearing outer race seat. Dust generated during operation of the direct drive motor and the brake is prevented from entering the motor rear end bearing set structure, so as not to affect normal operation and coaxial accuracy of the motor rear end bearing set structure. The second-stage ring structure with a larger diameter can be connected with the harmonic gear drive fixing seat with high coaxial accuracy through countersunk holes provided on an end face of the second stage ring structure or by fasteners. The diameter of the inner cavity of the second stage ring structure is larger than the diameter of the outer edge of the direct-drive motor, the brake and the harmonic gear drive. A wire outlet for the direct drive motor and the brake is provided on a side wall of the second-stage ring structure, so that the direct drive motor and the brake can be connected to a driver for control.

Further, an end of the harmonic gear drive fixing seat close to the motor rear end is a ring structure connected to the motor rear end bearing outer race seat; the ring structure can be connected with the motor rear end bearing outer race seat with high coaxial accuracy by fasteners. A diameter of an inner cavity of the ring structure is larger than the diameter of the outer edge of the direct-drive motor and the brake A wire outlet for the direct drive motor and the brake is provided on a side wall of the ring structure, so that the direct drive motor and the brake can be connected to the driver for control.

An end of the harmonic gear drive fixing seat near the harmonic gear drive is a two-stage annular structure; along the direction from the center of the long input shaft to the circumference thereof, the second stage annular structure comprises a first stage ring structure of the fixing seat and a second stage ring structure of the fixing seat. The first stage ring structure of the fixing seat is embedded and installed between the flexspline end bearing set and the harmonic gear drive. The second stage ring structure of the fixing seat is fixedly connected with the harmonic gear drive. In the two-stage annular structure, fasteners can be used to connect an outer shell of the harmonic gear drive with high coaxial accuracy through countersunk holes provided on an end surface of the second stage ring structure with a larger diameter so that the flexspline of the harmonic gear drive does not produce deformation perpendicular to the axis under the condition of no load, so that the output end of the circular spline of the harmonic gear drive can be adjusted to a position with high coaxial accuracy with the joint shaft structure. The first stage ring structure is used to install the flexspline end bearing set. An outer diameter of the first stage ring structure is less than a diameter of an inner hole of the flexspline of the harmonic gear drive, so that the flexible-end bearing structure can be installed in the inner cavity of the flexspline of the harmonic gear drive during installation to effectively shorten length of the long input shaft. The diameter of the inner cavity of the first stage ring structure is slightly larger than the diameter of the outer edge of the outer races of the flexspline end bearing set to achieve precise hole-shaft engagement. An annular step is provided in the first stage ring structure has an annular step near the inner bearing of the flexspline end bearing set. Sealing rings can be installed inside the annular step to prevent dust from entering the bearing structure during operation of the direct drive motor and the brake and affecting operation stability and coaxial accuracy of the bearing structure.

Further, the motor rear end bearing set and the flexspline end bearing set have the same structure, respectively comprising two bearings and two cushion rings arranged coaxially, the two bearings are arranged in parallel on the long input shaft, the two cushion rings are an inner cushion ring and an outer cushion ring, the inner cushion ring is arranged between inner races of the two bearings, the outer cushion ring is arranged between outer races of the two bearings. The motor rear end bearing set and the flexspline end bearing set can be composed of a pair of identical bearings and inner and outer cushion rings with a certain height difference provided between the inner races of the two bearings and the outer races of the two bearings, or a pair of prefabricated bearings that bearing clearances have been eliminated. When installing the motor rear end bearing set with inner and outer cushion rings with a height difference, eliminate the bearing clearances by firstly compacting the inner race of the outer bearing in the motor rear end bearing set and the inner race of the inner bearing in the motor rear end bearing set with the motor rear end bearing inner race pressing ring, compacting the outer race of the outer bearing in the motor rear end bearing set and the outer race of the inner bearing in the motor rear end bearing set, and utilizing the height difference as a thickness of the outer cushion ring of the motor rear end bearing set is bigger than a thickness of the inner cushion ring of the motor rear end bearing set; or by compacting the inner race of the outer bearing in the motor rear end bearing set and the inner race of the inner bearing in the motor rear end bearing set with the motor rear end bearing inner race pressing ring and utilizing the height difference as the thickness of the inner cushion ring of the motor rear end bearing set is bigger than the thickness of the outer cushion ring of the motor rear end bearing set. When installing the flexspline end bearing set, eliminate the bearing clearances by first compacting the inner race of the inner bearing in the flexspline end bearing set and the inner race of the outer bearing in the flexspline end bearing set with the flexspline end bearing inner race pressing ring, and utilizing a height difference as a thickness of the outer cushion ring of the flexspline end bearing set is bigger than a thickness of the inner cushion ring of the flexspline end bearing set. When using the prefabricated bearings that the bearing clearances have been eliminated, it is only necessary to install the prefabricated bearings normally and no height difference is required.

Further, along the direction from the center of the long input shaft to the circumference thereof, the harmonic gear drive comprises a wave generator, a flexspline, a circular spline and an outer shell arranged from inside to outside, an inner wall of the wave generator is connected with the long input shaft, the flexspline is located between the wave generator and the circular spline, and the outer shell is fixedly connected with the harmonic gear drive fixing seat.

Compared with the prior art, the present invention has following beneficial effects:

The shafting structure of the integrated joint of the cooperative robot can assist to achieve high precision position feedback and control, so that with this shafting structure both the input end of the harmonic wave reducer and the output end of the circular spline obtain high coaxial accuracy under load conditions so that the angle encoder at the motor rear end and the angle encoder at the output end of the circular spline of the harmonic gear drive can obtain high precision feedback of position information to realize high precision feedback and control of the integrated joint of the cooperative robot. At the same time, the shafting structure of the integrated joint of the cooperative robot can adapt to various working environment temperatures, especially when the motor heats after being started and running for a period of time, structural stability and coaxial accuracy of the input end of harmonic gear drive and the output end of circular spline will not be affected as the input shaft becomes longer.

In addition, in the shafting structure of the integrated joint of the cooperative robot, the hollow long input shaft can be used to pass trachea, oil pipes, cables and optical fibers, etc., required by the cooperative robot. A three stage cylinder structure with gradually reducing dimension towards an outer side of the motor rear end is respectively provided on the long input shaft near the motor rear end and the flexspline end, and the three stage cylinder structure forms respectively with the motor rear end bearing set, the motor rear end bearing outer race seat, the motor rear end bearing inner race pressing ring, and the motor rear end bearing outer race pressing ring to be a motor rear end bearing clearance elimination structure with high coaxial precision, and forms with the flexspline end bearing set, the harmonic gear drive fixing seat and the flexspline end bearing inner race pressing ring to be a flexspline end bearing clearance elimination structure, and thereby establishing a joint shafting structure with high coaxial precision. The harmonic gear drive input end formed by the long input shaft, the wave generator of the harmonic gear drive and the flexspline is concentric with the harmonic gear drive fixing seat. When the harmonic gear drive is installed on the harmonic gear drive fixing seat with fasteners and the harmonic gear drive shell, adjust the output end of the harmonic gear drive circular spline until in high coaxial accuracy with the harmonic gear drive fixing seat. In this way, when the flexspline is installed without load, deformation perpendicular to the axis of the shaft system can be avoided, and the high precision coaxiality between the input end of the harmonic gear drive and the output end of the circular spline can be guaranteed, and overall rigidity of the joint shaft system can be improved. Since load and deadweight of the output end is evenly distributed, high coaxial accuracy can be maintained between the input end and the output end of harmonic gear drive under load condition, which provides a prerequisite for high precision position feedback and control of the joint. At the same time, the flexspline end bearing structure is installed in the internal cavity of the harmonic gear drive, which is beneficial to shorten the length of the long input shaft without affecting the function of the flexspline, so as to facilitate machining accuracy and cost control. In addition, in the present shaft structure a dead center and a live center for the long input shaft to become longer are formed so that in different temperature conditions of the working environment, especially when temperature rises as the motor is started and runs for a period of time, length change of the long input shaft won't affect relative positional relationship between the rotating part and the fixed part of the angle encoder provided on the motor rear end, and relative positional relationship between the rotating part and the fixed part of the angle encoder provided on the output end of the circular spline in the harmonic gear drive, and affect position measurement results.

Figure 1:
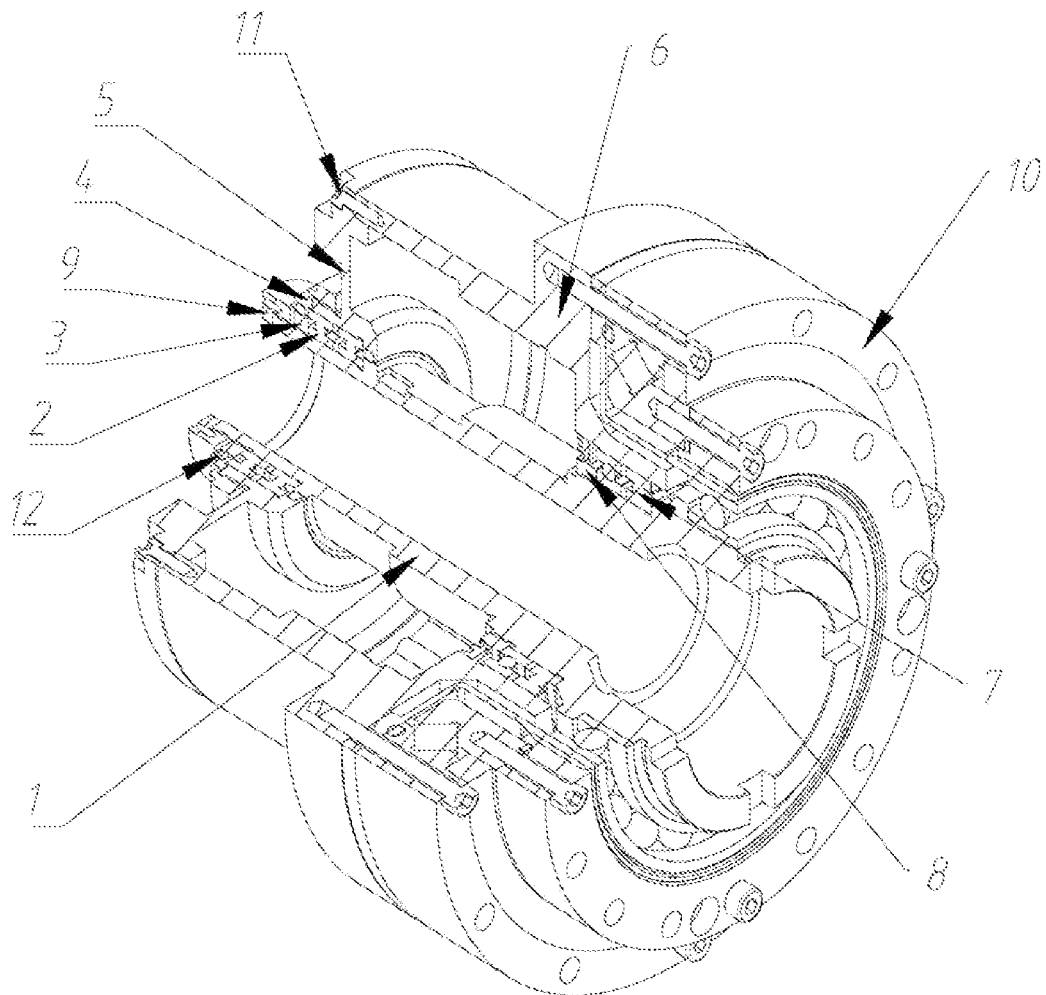
FIG. 1 is a structural schematic diagram of a shafting structure of an integrated joint of a cooperative robot.

The markups in the above figures are indicated as follows: 1 long input shaft; 1-1 flexspline mounting shoulder; 1-2 three-stage cylindrical structure of the motor rear end; 1-3 three-stage cylindrical structure of the flexspline end; 2 motor rear end bearing set; 2-1 outer bearing of the motor rear end bearing set; 2-2 inner bearing of the motor rear end bearing set; 2-3 outer cushion ring of the motor rear end bearing set; 2-4 inner cushion ring of the motor rear end bearing set; 3 motor rear end bearing inner race pressing ring; 4 motor rear end bearing outer race pressing ring; 5 motor rear end bearing outer race seat; 5-1 annular shoulder of the motor rear end bearing outer race seat; 5-2 wire outlet of motor rear end bearing outer race seat; 6 harmonic gear drive fixing seat; 6-1 wire outlet of the harmonic gear drive fixing seat; 7 flexspline end bearing set; 7-1 inner bearing of the flexspline end bearing set; 7-2 outer bearing of the flexspline end bearing set; 7-3 outer cushion ring of the flexspline end bearing set; 7-4 inner cushion ring of the flexspline end bearing set; 8 flexspline end bearing inner race pressing ring; 9 motor rear end angle encoder mounting seat; 10 harmonic gear drive; 10-1 wave generator; 10-2 outer shell; 10-3 flexspline; 10-4 circular spline; 11 fastener; 12 sealing, ring.

SPECIFIC EMBODIMENT

The invention is further described in detail in combination with embodiments below, but the embodiments of the invention are not limited to these described here.

EMBODIMENT

The present invention provides a shafting structure of an integrated joint for a collaborative robot as shown in FIGS. 1-5, comprising a long input shaft 1, a motor rear end bearing set 2, a motor rear end bearing inner race pressing ring 3, a motor rear end bearing outer race pressing ring 4, a motor rear end bearing outer race seat 5, a harmonic gear drive fixing seat 6, a flexspline end bearing set 7, a flexspline end bearing inner race pressing ring, a motor rear end angle encoder mounting seat 9, a harmonic gear drive 10, fasteners 11 and sealing rings 12.

One end of the long input shaft 1 passes through the wave generator 10-1 of the harmonic gear drive 10 and the flexspline 10-3 to form an input end of the harmonic gear drive through precise shaft-hole fit of high coaxial accuracy.

One end of the long input shaft 1 close to the input end of the harmonic gear drive is provided with a two-stage cylindrical structure. The input shaft flexspline mounting shoulder 1-1 formed by the two-stage cylindrical structure is used to install an assembly unit of the harmonic gear drive wave generator 10-1 and the flexspline 10-3. Another end of the long input shaft near the motor rear end and a central part thereof near the wave generator of the harmonic gear drive is respectively provided with a three-stage cylindrical structure (that is, a three-stage cylindrical structure of the motor rear end 1-2 and a three-stage cylindrical structure of the flexspline end 1-3) for respectively installing corresponding bearing sets. The three-stage cylindrical structure of the motor rear end 1-2 the motor rear end bearing set 2, the motor rear end bearing inner race pressing ring 3, the motor rear end bearing outer race pressing ring 4 and the motor rear end bearing outer race seat 5 constitute a motor rear end bearing structure with high coaxial accuracy, and the motor rear end bearing inner race pressing ring 3 is connected to the three-stage cylindrical structure of the motor rear end 1-2 via threads or fasteners so that the motor rear end bearing inner race pressing ring 3 firstly presses upon and fixes an inner race of an outer bearing of the motor rear end bearing set 2-1 and an inner bearing of the motor rear end bearing set 2-2, then connects to the motor rear end bearing outer race pressing ring 4 and the three-stage cylindrical structure of the motor rear end 1-2, and therefore the motor rear end bearing outer race pressing ring 4 firstly squeezes an outer race of the outer bearing of the motor rear end bearing set 2-1 and an outer race of the inner bearing of the motor rear end bearing set 2-2, thereby eliminating bearing clearances. At the same time, by eliminating the bearing clearances in this way, a dead point is formed in the long input shaft, so that when a length of the long input shaft changes as the temperature rises when the motor is started and runs for a period of time, overall structural stability of a rotating part of the angle encoder provided at the motor rear end connected to the long input shaft 1 will not be affected by length change of the long input shaft, and consequently the angle measurement accuracy will not degrade.

The three-stage cylindrical structure of the flexspline end 1-3, the flexspline end bearing set 7, the harmonic gear drive fixing seat 6 and the flexspline end bearing inner race pressing ring 8 constitute a flexspline end bearing structure with a high coaxial accuracy, the flexspline end bearing inner race pressing ring 8 is connected to the three-stage cylindrical structure of the flexspline end 1-3 by threads or fasteners so that the flexspline end bearing inner race pressing ring 8 squeezes an inner race of the inner bearing of the flexspline end bearing set 7-1 and an inner race of the outer bearing of the flexspline end bearing set 7-2, thereby eliminating the bearing clearance. And by eliminating the bearing clearances in this way, gaps are reserved in between both sides of outer races of the flexspline end bearing set 7 and the harmonic gear drive fixing seat 6, so that a live center is formed in the long input shaft 1, when temperature changes in different working conditions (especially when the motor is started and runs for some time and heats, the temperature rises), a length of the long input shaft 1 can change freely along the shaft direction according to temperature changes without generating any axial deformation. And by adopting this structure, it can be promised that, in different working conditions and temperatures, especially when the motor heats after being started and running for some time, a change of length of the long input shaft won't affect overall structural stability of the angle encoder provided on a circular spline output end of the harmonic gear drive 10-4, and degradation of angle measurement accuracy can be avoided.

The harmonic gear drive fixing seat 6 and the motor rear end bearing outer race seat 5 are connected with a high coaxial precision by fasteners, the harmonic gear drive fixing seat 6 and an outer shell 10-2 of the harmonic gear drive are connected by fasteners 11, an output end of a circular spline 10-4 of the harmonic gear drive and the harmonic gear drive fixing seat 6 are adjusted to be highly and precisely concentric, so that when installing, in case of no load, the flexspline 10-3 of the harmonic gear drive won't produce deformation perpendicular to the axis of the shaft system, and the output end of the circular spline 10-4 of the harmonic gear drive is located in a position of high coaxial accuracy with the joint shaft system. At the same time, such a double shaft bearing set structure cannot only increase the overall rigidity of the integrated joint, ensure structural stability of the harmonic gear drive input end and the circular spline output end under various working conditions and temperatures, and obtain high coaxial precision between the input end and the output end, but also can evenly distribute the influence of structural weight and load weight to the joint shafting structure, thereby avoiding the influence of local deformation caused by dead weight and load on accuracy of joint position feedback and control.

The long input shaft 1 is a hollow shaft, and a central hole thereof is used to pass trachea, oil pipes, cables, optical fibers, etc., required by the cooperative robot; one end of the long input shaft near the input end of the harmonic gear drive is provided with a flexspline mounting shoulder 1-1 formed by a two-stage cylindrical structure, a diameter of an outer first stage cylindrical structure is smaller, slightly smaller than a diameter of an inner hole of the harmonic gear drive wave generator 10-1, so as to form a precise shaft-hole fit; another end of the long input shaft near the motor rear end and a central part thereof near the wave generator of the harmonic gear drive are respectively provided with a three-stage cylinder structure with gradual changing diameters, in the two three-stage cylindrical structures, the diameters of the cylindrical structures at all levels gradually shrink towards an outside direction of the motor rear end so that the long input shaft 1 can be installed in the harmonic gear drive wave generator 10-1 to form the input end of the harmonic gear drive, and the input shaft flexspline end bearing set 7, the direct drive motor, the brake and the motor rear end bearing set 2 can be installed stage by stage. A groove for installing the direct drive motor and brake is arranged between the flexspline end and the three-stage cylindrical structure of the motor rear end 1-2, so that the direct drive motor and brake can be installed through keys or splines. A shape of the groove can be determined according to an installation mode of the direct drive motor and the brake. Between the direct drive motor and the flexspline end bearing set is provided a sealing ring 12, which can prevent dust generated during operation of the direct drive motor and the brake from entering the input shaft flexspline end bearing set 7 and the harmonic gear drive 10, so as not to affect normal operation and coaxial accuracy of the flexspline end bearing set 7 and the harmonic gear drive 10. The three-stage cylindrical structure of the motor rear end 1-2 of the long input shaft, the motor rear end bearing set 2, the motor rear end bearing inner race pressing ring 3, the motor rear end bearing outer race pressing ring 4 and the motor rear end bearing outer race seat 5 constitute a structure at the motor rear end to eliminate bearing clearances. At the same time, and by eliminating the bearing clearances in this way, a dead point of length change of the long input shaft 1 is formed, so that when the temperature rises after the motor is started and runs for a period of time, a change of the long input shaft length will not affect a position of the rotating part of the angle encoder of the motor rear end connected to the long input shaft 1, so as to prevent degradation of angle measurement accuracy. In addition, between the motor rear end bearing outer race seat 5 and the three-stage cylindrical structure at the motor rear end 1-2 is provided a sealing ring 12, which can prevent the dust generated during operation of the direct drive motor and the brake from entering the bearing set structure at the motor rear end, so as not to affect normal operation and coaxial accuracy of the motor rear end bearing set.

A first stage cylinder structure at an outer side the three-stage cylindrical structure of the motor rear end is connected with the motor rear end bearing inner race pressing ring 3 through threads or fasteners during installation, so that the motor rear end bearing inner race pressing ring 3 supports the inner race of the outer bearing of the motor rear end bearing set 2-1. An end face of the first stage cylinder structure of the three-stage cylindrical structure of the motor rear end 1-2 is provided with threaded holes which can be connected with a motor rear end angle encoder mounting seat 9 with high coaxial precision through fasteners, so as to provide a prerequisite for high precision feedback of motor position signals and control of motor rotation angles; a diameter of a second stage cylindrical structure of the three-stage cylindrical structure of the motor rear end 1-2 is slightly smaller than a diameter of an inner edge of the inner races of the motor rear end bearing set 2 to achieve precise hole shaft fit. A diameter of a third stage cylindrical structure of the three-stage cylindrical structure of the motor rear end 1-2 is less than an inner edge diameter of the outer races of the motor rear end bearing set 2, and greater than an outer edge diameter of the inner races of the motor rear end bearing set 2, so that the inner races of the motor rear end bearing set 2 is backed by a side of the third stage cylindrical structure of the three-stage cylindrical structure during installation.

The three-stage cylindrical structure of the flexspline end 1-3, the flexspline end bearing set 7, the harmonic gear drive fixing seat 6 and the flexspline end bearing inner race pressing ring 8 constitute a structure at the input shaft flexspline end to eliminate the bearing clearance with a high coaxial accuracy. At the same time, by eliminating clearances in this way, more gaps are left between both sides of the outer races of the flexspline end bearing set 7 and the harmonic gear drive fixing seat 6, so as to form a live center for the long input shaft 1 to become longer under various working environment temperature conditions, especially when the temperature rises after the motor is started and runs for a period of time, the input long shaft 1 at this end can change freely along the axial direction as the temperature changes without any change in the radial direction. This structure can ensure that under various working environment temperature conditions, especially when the motor is started and runs for a period of time and becomes heated, a change of a length of the long input shaft 1 will not affect stability of the overall structure of the angle encoder connected to the output end of the harmonic gear drive, to prevent reduction of angle measurement accuracy.

A first stage cylindrical structure inside the three-stage cylindrical structure of the flexspline end 1-3 is connected with the flexspline end bearing inner race pressing ring 8 by threads or fasteners during installation, so that the flexspline end bearing inner race pressing ring 8 supports the inner race of the inner bearing of the flexspline end bearing set 7-1; a diameter of a second stage cylinder structure on the three-stage cylindrical structure of the flexspline end 1-3 is slightly smaller than an inner diameter of the inner races of the flexspline end bearing set 7 to achieve precise hole shaft fit; a diameter of a third stage cylindrical structure of the three-stage cylindrical structure of the flexspline end 1-3 is less than a diameter of the inner edge of the outer races of the flexspline end bearing set 7, and greater than the outer edge diameter of the inner races of the flexspline end bearing set 7, so that a side of the third stage cylindrical structure of the three-stage cylindrical structure supports the inner race of the outer bearing of the flexspline end bearing set 7-2 during installation.

The motor rear end bearing set 2 and the flexspline end bearing set 7 are respectively composed of a pair of identical bearings and an inner cushion ring and an outer cushion ring provided respectively between the inner races and the outer races of the two bearings with a height difference. When the motor rear end bearing set 2 is installed with the inner cushion ring and the outer cushion ring with height differences, the motor rear end bearing inner race pressing ring 3 firstly fixes the inner races of the outer bearing of the motor rear end bearing set 2-1 and the inner bearing of the motor rear end bearing set 2-2 so that the height difference that the outer cushion ring of the motor rear end bearing set 2-3 is higher than the inner cushion ring of the motor rear end bearing set 2-4 is used to eliminate the bearing clearance. While the flexspline end bearing set is installed, the flexspline end bearing inner race pressing ring 8 squeezes the inner races of the inner bearing of the flexspline end bearing set 7-1 and the outer bearing of the flexspline end bearing set 7-2 so that the height difference that the outer cushion ring of the flexspline end bearing set 7-3 is higher than the inner cushion ring of the flexspline end bearing set is used to eliminate the bearing clearance.

The motor rear end bearing inner race pressing ring 3 is an annular cylindrical structure, connected through inner threads provided therein to the three-stage cylindrical structure of the motor rear end 1-2 during installation so that the motor rear end bearing inner race pressing ring supports the inner race of the outer bearing of the motor rear end bearing set 2-1.

The motor rear end bearing outer race pressing ring 4 is a three-stage cylindrical structure which can be connected with the motor rear end bearing outer race seat 5 through inner threads provided on a first stage cylindrical structure of a largest diameter. A diameter of an inner cavity of a second stage cylindrical structure is larger than the outer edge diameter of the outer races of the motor rear end bearing set 2. A diameter of an inner cavity of a third stage cylindrical structure is smaller than the inner edge diameter of the outer races of the motor rear end bearing set 2, and larger than the outer edge diameter of the inner races of the motor rear end bearing set 2. When installing, a side of the third stage cylindrical structure supports the outer race of the outer bearing of the motor rear end bearing set 2-1. There is an annular groove on one side of an inner circular surface of the third stage cylindrical structure near the motor rear end bearing inner race pressing ring 3. A sealing ring 12 can be installed in the groove during installation to prevent external pollutants from entering the bearing structure and affecting operation stability and coaxial accuracy of the bearing structure.

Figure 5:
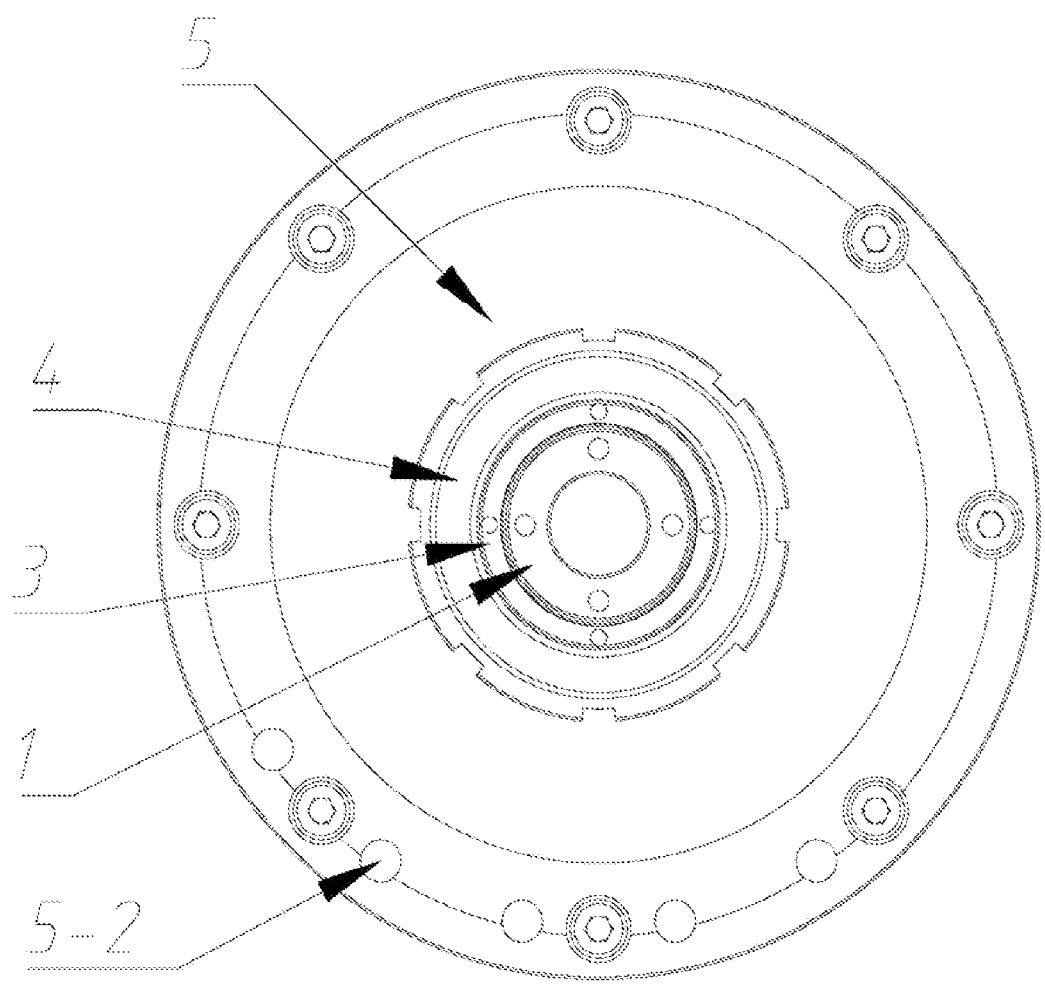
FIG. 5 is a view of an outer end of the motor rear bearing structure.
Figure 6:
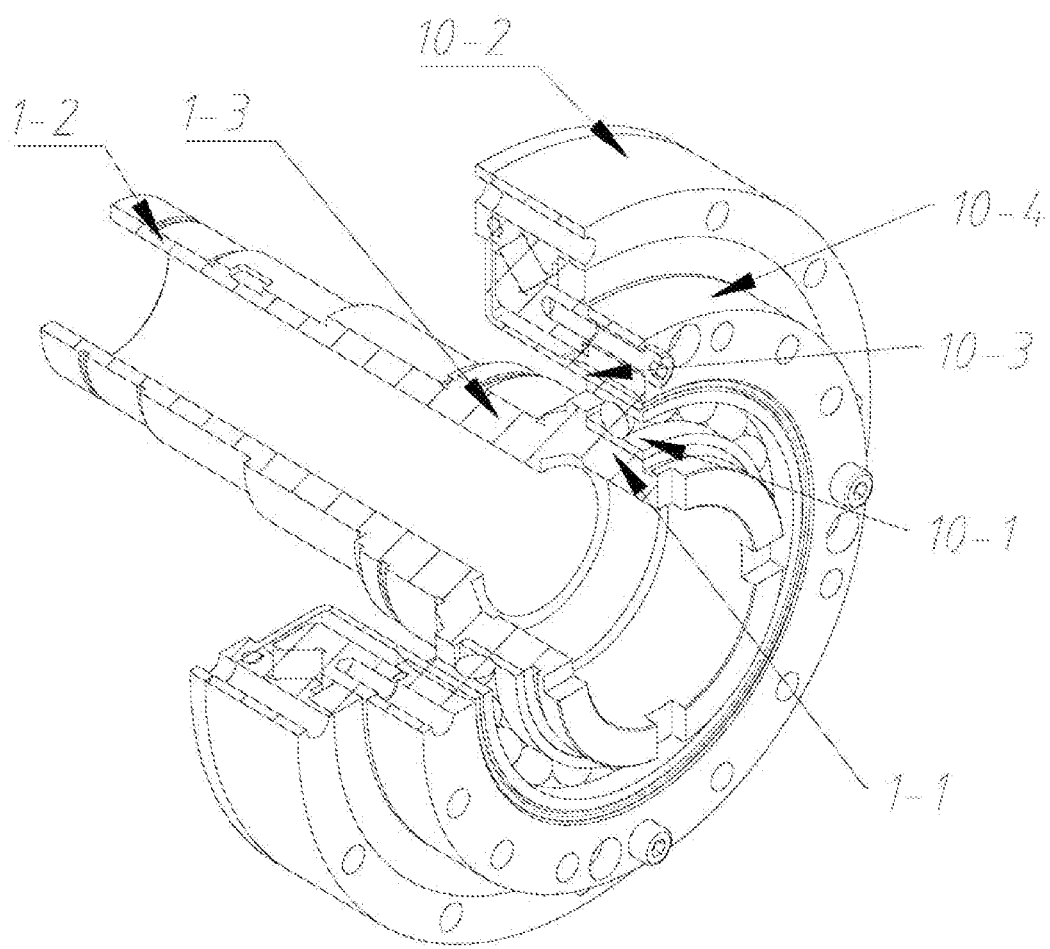
FIG. 6 is a structural schematic diagram of the input long shaft and the harmonic gear drive.

The motor rear end bearing outer race seat 5 is a two-stage cylindrical structure which is connected with the motor rear end bearing outer race pressing ring 4 through screws provided outside a first stage ring structure with a smaller diameter. A diameter of an inner hole of the first stage cylindrical structure is slightly larger than a diameter of the outer edge of the outer race of the motor rear end bearing set 2 to achieve a precise hole-shaft fit. A small annular shoulder is provided in an inner cavity of the first stage cylindrical structure. An inner diameter of the annular shoulder of the motor rear end bearing outer race seat 5-1 is larger than the outer edge diameter of the inner race of the motor rear end bearing set 2, and smaller than the inner edge diameter of the outer race of the motor rear end bearing set 2. When installing, the annular shoulder of the motor rear end bearing outer race seat 5-1 supports the outer race of the inner bearing of the motor rear end bearing set 2-2. There is a groove on an inner circular surface of the annular shoulder of the motor rear end bearing outer race seat 5-1 toward the three-stage cylindrical structure of the motor rear end 1-2. A sealing ring can be installed in the groove during installation, so as to form a seal between the third stage cylinder structure of the three-stage cylindrical structure of the motor rear end 1-2 and the motor rear end bearing outer race seat 5, thereby preventing dust generated during operation of the direct drive motor and the brake from entering the motor rear end bearing set structure, so as not to affect normal operation and coaxial accuracy of the motor rear end bearing set structure. The second stage annular structure with a larger diameter of the two-stage cylindrical structure can be connected to the harmonic gear drive fixing seat with high coaxial accuracy by passing fasteners through countersunk holes provided on an end face thereof. A diameter of the inner cavity of the second stage cylindrical structure is larger than a diameter of the outer edge of the direct drive motor and the brake. A side wall of the second stage cylindrical structure is provided with a wire outlet 5-2 of the direct-drive motor and the brake (as shown in FIG. 5), so that the direct-drive motor and the brake can be connected to a driver for control.

Figure 2:
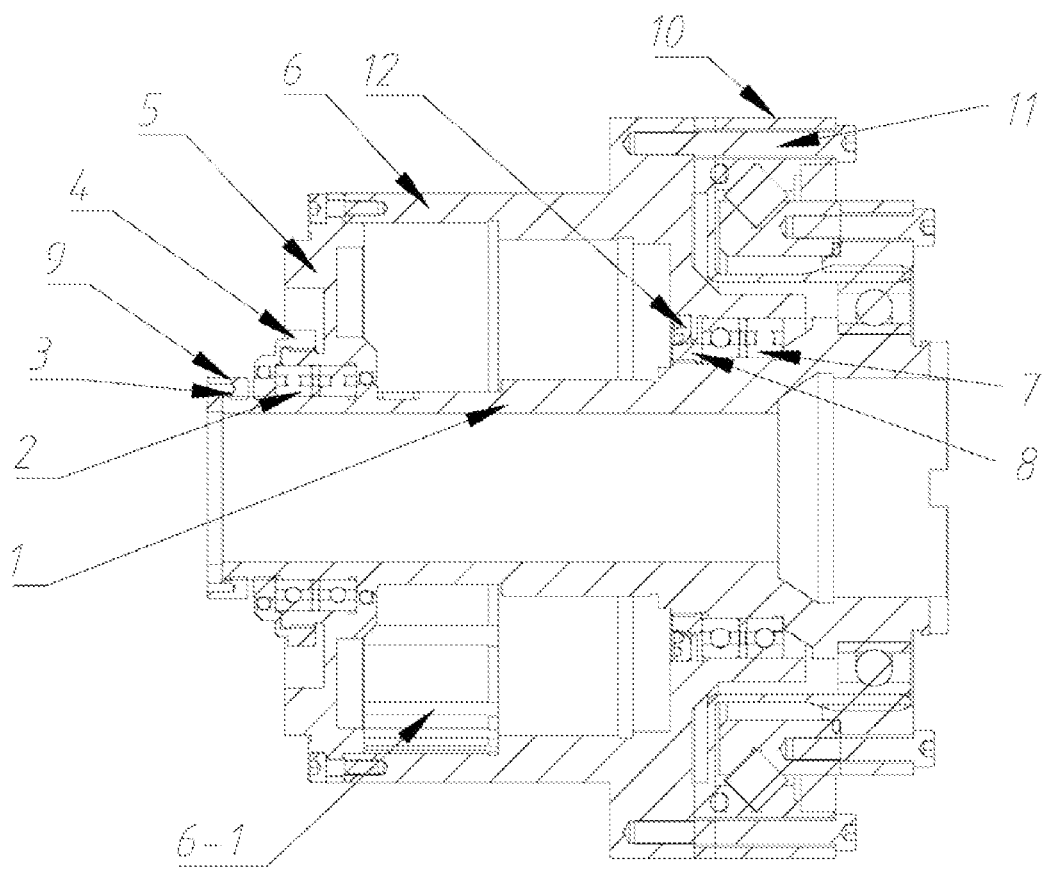
FIG. 2 is an axial section view of the shafting structure of the integrated joint of the cooperative robot.
Figure 3:
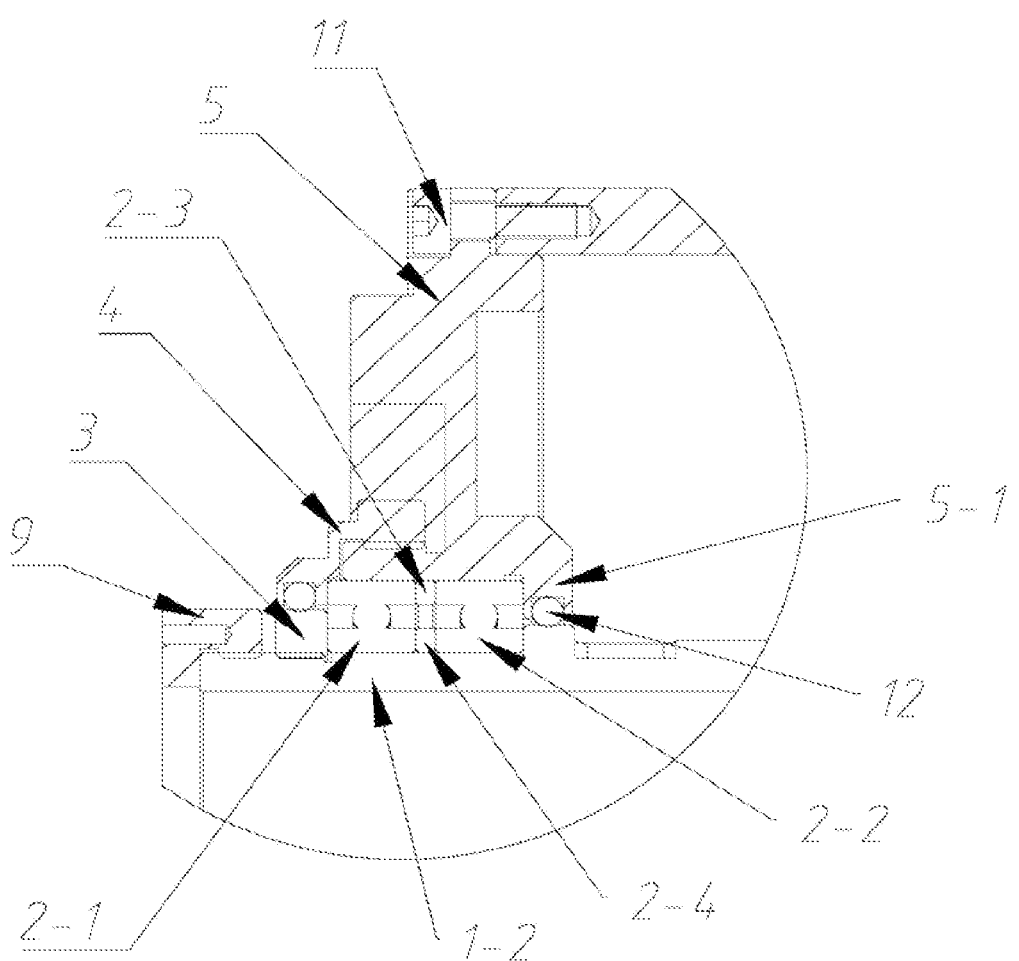
FIG. 3 is a partial enlargement of the motor rear end bearing structure.
Figure 4:
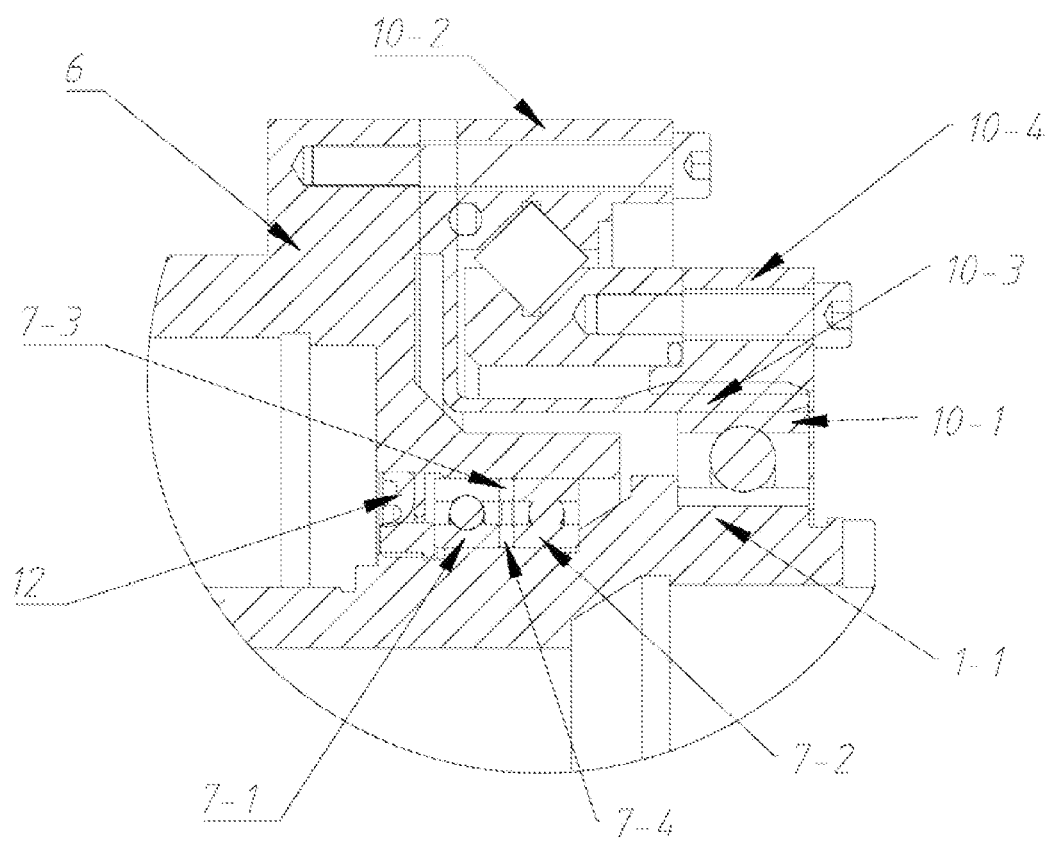
FIG. 4 is a partial enlargement of the harmonic gear drive and the flexspline end bearing structure.

One end of the harmonic gear drive fixing seat 6 near the harmonic gear drive 10 is an annular structure, which can be connected with the motor rear end bearing outer race seat 5 with high coaxial accuracy through fasteners 11. A diameter of an inner cavity of the annular structure is larger than a diameter of the outer edge of the direct drive motor and the brake. An wire outlet 6-1 for the direct drive motor and the brake (as shown in FIG. 2) is provided in a side wall of the annular structure has, so that the direct drive motor and the brake can be connected to a driver for control.

One end of the harmonic gear drive fixing seat 6 near the harmonic gear drive 10 is a two-stage cylindrical structure which can be connected with the outer shell of the harmonic gear drive 10-2 with high coaxial accuracy through countersunk holes provided on an end face of a second stage cylindrical structure with a larger diameter through fasteners 11, so that the flexspline 10-3 of the harmonic gear drive does not produce deformation perpendicular to the shaft center under condition of no load, so that the output end of the circular spline 10-4 of the harmonic gear drive can be adjusted to a position with high coaxial accuracy with the joint shaft system. A first stage cylindrical structure is used to install the flexspline end bearing set 7. An outer diameter of the first stage cylindrical structure is less than a diameter of an inner hole of the harmonic gear drive flexspline 10-3, so that the input shaft flexspline end bearing structure can be installed in the inner cavity of the harmonic gear drive flexspline 10-3 during installation, and a length of the input long shaft 1 can be effectively shortened. The diameter of the inner cavity of the first stage cylindrical structure is slightly larger than the diameter of the outer edge of the outer race of the flexspline end bearing set 7 to achieve precision hole-shaft engagement. An annular step is provided in the first stage cylindrical structure near the inner bearing of the flexspline end bearing set 7-1. A sealing ring is installed inside the annular step to prevent dust generated during operation of the direct drive motor and the brake from entering the bearing structure and affecting operation stability and coaxial accuracy of the bearing structure.

The flexspline end bearing inner race pressing ring 8 is an annular cylindrical structure. During installation, the flexspline end bearing inner race pressing ring 8 is connected with the three-stage cylindrical structure of the flexspline end 1-3 through inner threads provided thereon, so that the flexspline end bearing inner race pressing ring 8 supports the inner race of the outer bearing of the flexspline end bearing set 7-2.

In the present embodiment, the hollow long input shaft can be used to pass trachea, oil pipes, cables and optical fibers, etc., required by the cooperative robot. A three stage cylinder structure with gradually reducing dimension towards an outer side of the motor rear end is respectively provided on the long input shaft near the motor rear end and the flexspline end, and the three stage cylinder structure forms respectively with the motor rear end bearing set, the motor rear end bearing outer race seat, the motor rear end bearing inner race pressing ring, and the motor rear end bearing outer race pressing ring to be a motor rear end bearing clearance elimination structure with high coaxial precision, and forms with the flexspline end bearing set, the harmonic gear drive fixing seat and the flexspline end bearing inner race pressing ring to be a flexspline end bearing clearance elimination structure, and thereby establishing a joint shafting structure with high coaxial precision. The harmonic gear drive input end formed by the long input shaft, the wave generator of the harmonic gear drive and the flexspline is concentric with the harmonic gear drive fixing seat. When the harmonic gear drive is installed on the harmonic gear drive fixing seat with fasteners and the harmonic gear drive shell, adjust the output end of the harmonic gear drive circular spline until in high coaxial accuracy with the harmonic gear drive fixing seat. In this way, when the flexspline is installed without load, deformation perpendicular to the axis of the shaft system can be avoided, and the high precision coaxiality between the input end of the harmonic gear drive and the output end of the circular spline can be guaranteed, and overall rigidity of the joint shall system can be improved. Since load and deadweight of the output end is evenly distributed, high coaxial accuracy can be maintained between the input end and the output end of harmonic gear drive under load condition, which provides a prerequisite for high precision position feedback and control of the joint. At the same time, the flexspline end bearing structure is installed in the internal cavity of the harmonic gear drive, which is beneficial to shorten the length of the long input shaft without affecting the function of the flexspline, so as to facilitate machining accuracy and cost control. In addition, in the present shaft structure a dead center and a live center for the long input shaft to become longer are formed so that in different temperature conditions of the working environment, especially when temperature rises as the motor is started and runs for a period of time, length change of the long input shaft won't affect relative positional relationship between the rotating part and the fixed part of the angle encoder provided on the motor rear end, and relative positional relationship between the rotating part and the fixed part of the angle encoder provided on the output end of the circular spline in the harmonic gear drive, and affect position measurement results.

The present invention can be executed in the foregoing manner, and the abovementioned embodiments are only preferred embodiments of the present invention and are not intended to limit the scope of the present invention; that is, all equivalent replacements and modifications made in accordance with contents of the present invention are covered by the protection of the claims appended herewith.

What is claimed is:

1. A shafting structure of an integrated joint for a collaborative robot, wherein comprising a long input shaft, a harmonic gear drive, a motor rear end bearing set, a flexspline end bearing set, a motor rear end bearing inner race pressing ring, a motor rear end bearing outer race pressing ring, a flexspline end bearing inner race pressing ring, a motor rear end bearing outer race seat and a motor rear end angle encoder mounting seat, wherein two ends of the long input shaft are respectively a motor rear end and a flexspline end, and the harmonic gear drive is installed on the flexspline end;

on the motor rear end are coaxially provided the motor rear end bearing set, the motor rear end bearing inner race pressing ring, the motor rear end bearing outer race pressing ring, the motor rear end bearing outer race seat and the motor rear end angle encoder mounting seat; the motor rear end bearing inner race pressing ring is provided around an end face of the motor rear end bearing set, the motor rear end bearing outer race pressing ring is provided around a periphery of the motor rear end bearing inner race pressing ring and compacts a periphery of the motor rear end bearing set, the motor rear end bearing outer race seat is pressed against the periphery of the motor rear end bearing set, and the motor rear end angle encoder mounting seat is provided on an outer end of the motor rear outer race pressing ring;

and on the flexspline end are coaxially provided the flexspline end bearing set, the flexspline end bearing inner race pressing ring and the harmonic gear drive; the flexspline end bearing inner race pressing ring is provided on one side of an end face of the flexspline end bearing set, and the harmonic gear drive is provided on a periphery of the flexspline end bearing set and another side of the end face of the flexspline end bearing set.

2. The shafting structure of an integrated joint for a collaborative robot according to claim 1, wherein on one side of the harmonic gear drive is further provided a harmonic gear drive fixing seat, one end of the harmonic gear drive fixing seat extends into an inner cavity of a flexspline of the harmonic gear drive and is pressed between the flexspline end bearing set and the harmonic gear drive, and another end of the harmonic gear drive fixing seat is fixedly connected to the motor rear end bearing outer race seat.

3. The shafting structure of an integrated joint for a collaborative robot according to claim 1, wherein the long input shaft is a hollow shaft and an outer wall of the long input shaft is consisted of several cylindrical structures with gradually changing diameters; the outer wall of the long input shaft where the harmonic gear drive is connected is a two-stage cylindrical structure, the outer wall of the long input shaft connected to the flexspline end bearing inner race pressing ring and the flexspline end bearing set is a three-stage cylindrical structure, the outer wall of the long input shaft connected to the motor rear end bearing inner race pressing ring and the motor rear end bearing set is also a three-stage cylindrical structure.

4. The shafting structure of an integrated joint for a collaborative robot according to claim 1, wherein both the motor rear end bearing inner race pressing ring and flexspline end bearing inner race pressing ring are of annular cylindrical structures.

5. The shafting structure of an integrated joint for a collaborative robot according to claim 1, wherein the motor rear end bearing outer race pressing ring is a three-stage ring structure, along a direction from a middle part of the long input shaft to the motor rear end, the three-stage ring structure successively comprises a first-stage ring structure of the outer race pressing ring, a second-stage ring structure of the outer race pressing ring and a third-stage ring structure of the outer race pressing ring; the first-stage ring structure of the outer race pressing ring is connected with the motor rear end bearing outer race seat through threads or fasteners; a diameter of an inner cavity of the second-stage ring structure of the outer race pressing ring is larger than an outer edge diameter of outer races of the motor rear end bearing set; a diameter of an inner cavity of the third-stage ring structure of the outer race pressing ring is smaller than the outer edge diameter of the outer races of the motor rear end bearing set, and larger than an outer edge diameter of inner races of the motor rear end bearing set; and a sealing ring is provided at a connection place where the third-stage ring structure of the outer race pressing ring is connected to the motor rear end bearing inner race pressing ring.

6. The shafting structure of an integrated joint for a collaborative robot according to claim 1, wherein the motor rear end bearing outer race seat is a two-stage ring structure, along a direction from a center of the long input shaft to outside, and the two-stage ring structure successively comprises a first-stage ring structure of the motor rear end bearing outer race seat and a second-stage ring structure of the motor rear end bearing outer race seat; a periphery of the first-stage ring structure of the motor rear end bearing outer race seat is connected to the motor rear end bearing outer race pressing ring via threads or fasteners, an inner cavity of the first-stage ring structure of the motor rear end bearing outer race seat is further provided with an annular shoulder, an inner edge diameter of the annular shoulder is larger than an outer edge diameter of inner races of the motor rear end bearing set but smaller than an outer edge diameter of outer races of the motor rear end bearing set; and the second-stage ring structure of the motor rear end bearing outer race seat is connected to the harmonic gear drive fixing base.

7. The shafting structure of an integrated joint for a collaborative robot according to claim 1, wherein one end of the harmonic gear drive fixing seat near the motor rear end is an annular structure and is fixedly connected with the motor rear end bearing outer race seat; one end of the harmonic gear drive fixing seat near the harmonic gear drive is a two-stage ring structure, and along a direction from a center of the long input shaft to outside, the two-stage ring structure successively comprises a first-stage ring structure of the harmonic gear drive fixing seat and a second-stage ring structure of the harmonic gear drive fixing seat, the first-stage ring structure of the harmonic gear drive fixing base is embedded and installed between the flexible end bearing set and the harmonic gear drive, and the second-stage ring structure is fixedly connected to the harmonic gear drive.

8. The shafting structure of an integrated joint for a collaborative robot according to claim 1, wherein the motor rear end bearing set and the flexspline end bearing set share the same structure, respectively comprising two bearings and two cushion rings arranged coaxially, the two bearings are mounted side by side on the long input shaft, the two cushion rings are an inner cushion ring and an outer cushion ring, the inner cushion ring is arranged between inner races of the two bearings, and the outer cushion ring is arranged between outer races of the two bearings.

9. The shafting structure of an integrated joint for a collaborative robot according to claim 1, wherein along a direction from a center of the long input shaft to periphery thereof, the harmonic gear drive successively comprises a wave generator, a flexspline, a circular spline and an outer shell arranged from inside to outside, an inner wall of the wave generator is connected with the long input shaft, the flexspline is located between the wave generator and the circular spline, and the outer shell is fixedly connected with the harmonic gear drive fixing seat.

* * * * *